United States Patent
Holub et al.

(10) Patent No.: US 7,285,590 B2
(45) Date of Patent: Oct. 23, 2007

(54) AQUEOUS DISPERSIONS CONTAINING MULTI-STAGE EMULSION POLYMERS

(75) Inventors: Pavel Holub, Sokolov (CZ); Edward Enns McEntire, Kingsport, TN (US)

(73) Assignee: Hexion Specialty Chemicals, Inc., Columbus, OH (US)

(*) Notice: Subject to any disclaimer, the term of this patent is extended or adjusted under 35 U.S.C. 154(b) by 112 days.

(21) Appl. No.: 10/712,512

(22) Filed: Nov. 13, 2003

(65) Prior Publication Data

US 2005/0107527 A1    May 19, 2005

(51) Int. Cl.
*C08F 2/22* (2006.01)
(52) U.S. Cl. .................. 524/460; 524/461; 524/521; 524/522; 524/555; 526/201; 523/201
(58) Field of Classification Search .............. 523/201; 524/460, 461, 521, 522, 555; 526/201
See application file for complete search history.

(56) References Cited

U.S. PATENT DOCUMENTS

| | | | |
|---|---|---|---|
| 5,539,073 A | 7/1996 | Taylor et al. | |
| 5,596,035 A | 1/1997 | Désor et al. | |
| 6,005,042 A | 12/1999 | Désor et al. | |
| 6,875,834 B2 * | 4/2005 | Gray et al. | ............... 526/317.1 |

FOREIGN PATENT DOCUMENTS

| EP | 1 149 875 A1 | 10/2001 |
|---|---|---|
| EP | 1 302 515 A2 | 4/2003 |
| WO | WO 98/08882 A1 | 3/1998 |

* cited by examiner

*Primary Examiner*—Kriellion A Sanders

(57) ABSTRACT

Aqueous dispersions are disclosed, having a minimum film formation temperature no greater than about 50° C., that include a multi-stage emulsion polymer made by a process that includes a first polymerization stage, in which a first monomer mixture having a calculated glass transition temperature of at least about 50° C. is polymerized via free radical emulsion polymerization to obtain a first-stage emulsion polymer, and a second polymerization stage, in which a second monomer mixture, having a calculated glass transition temperature from about −30° C. to about 10° C., is polymerized via free radical emulsion polymerization, in the presence of the first-stage emulsion polymer. The dispersions are useful in a variety of coating compositions that exhibit improved block resistance.

19 Claims, No Drawings

AQUEOUS DISPERSIONS CONTAINING MULTI-STAGE EMULSION POLYMERS

FIELD OF THE INVENTION

The invention relates generally to aqueous dispersions containing emulsion polymers, and more specifically, emulsion polymers made using a multi-stage emulsion polymerization process. The aqueous dispersions are useful in a variety of coating compositions.

BACKGROUND OF THE INVENTION

Aqueous emulsion polymers, also called latexes or polymer dispersions, are known and used in both clear and pigmented form. They are used in many products, including interior and exterior architectural coatings, general metal coatings, adhesives, and the like. These latexes can be formed by aqueous emulsion polymerization of ethylenically unsaturated monomers such as styrene and its derivatives; acrylic and methacrylic acids; alkyl acrylates, methacrylates, and hydroxyl-substituted derivatives; vinyl acetate; acrylonitrile; glycidyl acrylates and methacrylates; and the like.

The large number of independent variables which can be manipulated in designing latex particles renders the preparation of improved latexes technically challenging. The emulsion polymers used in aqueous coating compositions must be hard enough to resist physical and chemical forces, but, at the same time, soft enough to form a continuous film. Film durability, water resistance, and chemical resistance are provided by hard polymers with glass transition temperatures (Tg) above ambient temperature. However, to be film-forming, these polymer dispersions must have a minimum filming temperature (MFT) at or below ambient temperature, to allow for fusion of the polymer particles into a continuous film.

Film properties can be further improved if the polymer film crosslinks upon film formation.

The preparation of emulsion polymers containing "dangling" or pendant double bonds is one possible solution for a coating system which crosslinks ambiently, thermally, and photochemically. See, for example, U.S. Pat. No. 5,539,073.

U.S. Pat. No. 5,596,035 discloses autocrossslinking aqueous dispersions, having a minimum filming temperature (MFT) of from 0° C. to about 50° C., which are a mixture of at least one carbonyl-containing soft latex polymer having an MFT of below about 20° C., at least one hard latex polymer having an MFT of above about 25° C., and at least one polyfunctional carboxylic hydrazide.

U.S. Pat. No. 6,005,042 discloses a polymer dispersion prepared by means of stepwise emulsion polymerization of monomer mixtures which include a proportion of hard monomers of at least 30% by weight in the first polymerization stage and at least 65% by weight in the second polymerization stage. The dispersions are said to have an MFT in the range from 0° to 40° C., and to form polymer films which possess high blocking resistance and scratch resistance with sufficient elasticity for the coating of substrates that are not dimensionally stable. To increase the chemical resistance, the dispersion may also include polyfunctional carboxylic hydrazides.

WO 98/08882 discloses an aqueous two-stage emulsion polymer having a first stage polymer with a calculated glass transition temperature of at least 70° C. and a second stage polymer having a calculated glass transition temperature between about 5° to 50° C., with a wet-adhesion promoting monomer being used in the second stage polymer.

EP 1 149 875 discloses an aqueous stain-blocking coating composition including an aqueous emulsion copolymer having a glass transition temperature (Tg) from −20 to 60° C. and including, as polymerized units, at least one ethylenically unsaturated nonionic monomer and 1.5-6%, by weight based on the dry weight of the copolymer, ethylenically unsaturated strong acid monomer, such as a phosphorus-containing strong acid monomer, or salts thereof.

EP 1 302 515 discloses a coating composition comprising a bimodal aqueous emulsion copolymer that includes as polymerized units from 0.1% to 10% by weight, based on the dry weight of the copolymer, of a strong acid monomer, or salts thereof. The bimodal copolymer contains small mode particles having a diameter of 50 to 150 nm, and large mode particles having a diameter of less than 400 nm. The coating composition is said to be particularly useful as a stain blocking coating.

While multi-stage emulsion polymers have been described in the prior art, there is a continuing need for aqueous dispersions containing emulsion polymers which provide a coating or film having excellent performance properties such as blocking resistance at elevated temperature, high gloss, water and chemical resistance, and excellent low temperature film formation, all with minimal VOC levels.

DETAILED DESCRIPTION OF THE INVENTION

In one embodiment, the invention relates to an aqueous dispersion, having a minimum film formation temperature no greater than about 50° C., comprising a multi-stage emulsion polymer made by a process that comprises a first polymerization stage, in which a first monomer mixture having a calculated glass transition temperature of at least about 50° C. is polymerized via free radical emulsion polymerization to obtain a first-stage emulsion polymer, the first monomer mixture including from about 80% to about 99.5% by weight of one or more ethylenically unsaturated non-ionic monomers; from 0% to about 5% by weight of one or more ethylenically unsaturated "weak" acid monomers; from 0% to about 5% by weight of one or more ethylenically unsaturated "strong" acid monomers; and from 0% to about 10% by weight of one or more ethylenically unsaturated monomers containing a keto group, wherein the first monomer mixture contains at least about 0.5% by weight of the strong acid monomers or the weak acid monomers, or a mixture of the two; and a second polymerization stage, in which a second monomer mixture having a calculated glass transition temperature from about −30° C. to about 10° C. is polymerized via free radical emulsion polymerization, in the presence of the emulsion polymer polymerized in the first polymerization stage, to obtain the multi-stage emulsion polymer, the second monomer mixture including from about 80% to about 99.5% by weight of one or more ethylenically unsaturated non-ionic monomers; from 0% to about 5% by weight of one or more ethylenically unsaturated "weak" acid monomers; from about 0.5% to about 10% by weight of one or more ethylenically unsaturated "strong" acid monomers; and from about 0.5% to about 10% by weight of one or more ethylenically unsaturated monomers containing a keto group.

The present invention may be understood more readily by reference to the following description of the invention, and to the Examples included therein.

Before the present compositions of matter and methods are disclosed and described, it is to be understood that this invention is not limited to specific synthetic methods or to particular formulations, unless otherwise indicated, and, as such, may vary from the disclosure. It is also to be understood that the terminology used is for the purpose of describing particular embodiments only, and is not intended to limit the scope of the invention.

The singular forms "a," "an," and "the" include plural referents, unless the context clearly dictates otherwise.

Optional or optionally means that the subsequently described event or circumstances may or may not occur. The description includes instances where the event or circumstance occurs, and instances where it does not occur.

Ranges may be expressed herein as from about one particular value, and/or to about another particular value. When such a range is expressed, it is to be understood that another embodiment is from the one particular value and/or to the other particular value.

Terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

Throughout this application, where patents or publications are referenced, the disclosures of these references in their entireties are intended to be incorporated by reference into this application, in order to more fully describe the state of the art to which the invention pertains.

According to the invention, aqueous dispersions having a minimum film formation temperature of no more than about 50° C. are provided, containing multi-stage emulsion polymers made by a multi-stage emulsion polymerization process that includes a first polymerization stage in which a first monomer mixture having a calculated glass transition temperature of at least about 50° C. is polymerized via free radical emulsion polymerization; and a second polymerization stage in which a second monomer mixture having a calculated glass transition temperature from about −30° to about 10° C. is polymerized via free radical emulsion polymerization in the presence of the polymer polymerized in the first polymerization stage.

In other embodiments, the aqueous dispersions may have a minimum film formation temperature no greater than about 40° C., or no greater than about 30° C.

In one embodiment, the monomer mixture of the first polymerization stage includes at least one ethylenically unsaturated strong acid monomer or at least one ethylenically unsaturated weak acid monomer, and the monomer mixture of the second polymerization stage includes at least one ethylenically unsaturated strong acid monomer, and at least one ethylenically unsaturated monomer containing a keto group.

In other embodiments, the aqueous dispersion further contains one or more crosslinker molecules, as defined elsewhere herein.

The applicant has found that these multi-stage emulsion polymers may be employed in coating compositions, such as paint compositions, to provide coatings having one or more of excellent block resistance, excellent film formation, good gloss, and low water uptake, when compared to simple morphology polymers and known multi-stage polymers.

In one embodiment, the polymer formed in the first polymerization stage has a calculated glass transition temperature of at least 50° C. and comprises from about 80% to about 99.5% by weight of ethylenically unsaturated non-ionic monomers; from 0% to about 5% by weight of ethylenically unsaturated "weak" acid monomers; from 0% to about 5% by weight of ethylenically unsaturated "strong" acid monomers; and from 0% to about 10% by weight of ethylenically unsaturated monomers containing a keto group. A minimum amount of the total of the weak and strong acid monomers used in the first polymerization stage is about 0.5% by weight of the monomers used in the first polymerization stage, in order to obtain stability of the first-stage emulsion polymer formed. According to this embodiment, the polymer formed in the second polymerization stage has a calculated glass transition temperature from about −30° to about 10° C., and comprises from about 80% to about 99.5% by weight of ethylenically unsaturated non-ionic monomers; from 0% to about 5% by weight of ethylenically unsaturated "weak" acid monomers; from about 0.5% to about 10% by weight of ethylenically unsaturated "strong" acid monomers; and from about 0.5% to about 10% by weight of ethylenically unsaturated monomers containing a keto group.

In various embodiments, the aqueous multi-stage polymer dispersions as disclosed herein include from about 80.0% to about 99.5% by weight, or from about 85.0% to about 98.5% by weight, or from about 88.0% to about 97.0% by weight all based on the dry weight of the polymer, of one or more ethylenically unsaturated nonionic monomers in each of the first and second monomer mixtures. As used herein, the terms "ethylenically unsaturated nonionic monomer" and "nonionic monomer" mean those monomers or monomer residues that do not bear an ionic charge at pHs at which paints are conventionally formulated, or at a pH from about 5 to about 10.

Ethylenically unsaturated non-ionic monomers useful according to the invention include, but are not limited to, (meth)acrylic ester monomers such as methyl acrylate, ethyl acrylate, ethyl methacrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate, (meth)acrylonitrile, (meth)acrylamide, amino-functional and ureido-functional monomers, styrene and substituted styrenes, butadiene, ethylene, propylene, α-olefins such as 1-decene, vinyl acetate, vinyl butyrate and other vinyl esters, and vinyl monomers such as vinyl chloride and vinylidene chloride. Preferred monomers include those comprising residues of two or more monomers providing all-acrylic polymers, predominantly-acrylic polymers, styrene-acrylic polymers, and vinyl acetate-acrylic polymers.

The aqueous two-stage polymer dispersions according to the invention may include, in the first polymerization stage, from 0% to about 5%, or from about 0% to about 2%, all by weight based on the weight of the first monomer mixture, and, in the second polymerization stage, from 0% to about 5%, or from about 0% to about 2%, all by weight based on the weight of the second monomer mixture, of one or more ethylenically unsaturated weak acid monomers, or salts thereof. As used herein, the terms "ethylenically unsaturated weak acid monomer" and "weak acid monomer" mean a monomer or monomer residue bearing a pendant acid group having a pKa (in water at 20° C.) of greater than 4, or a salt of such a weak acid.

Examples of ethylenically unsaturated weak acid monomers useful according to the invention include, but are not limited to, acrylic acid, methacrylic acid, crotonic acid, itaconic acid, fumaric acid, maleic acid, and maleic anhydride.

In various embodiments, the aqueous two-stage polymer dispersions include, in the first polymerization stage, from 0% to 5%, or from about 0% to about 2%, all by weight based on the weight of the first monomer mixture, and, in the second polymerization stage, from about 0.5% to about 10%, or from about 0.5% to about 7.5%, or from about 1.0% to about 5.0%, all by weight based on the weight of the second monomer mixture, of one or more ethylenically unsaturated strong acid monomers, or salts thereof. As used herein, the terms "ethylenically unsaturated strong acid monomer" and "strong acid monomer" mean a monomer bearing a pendant acid group having a pKa (in water at 20° C.) of less than 4, or a salt of such a strong acid monomer.

Examples of ethylenically unsaturated strong acid monomers useful according to the invention include, but are not limited to, 2-acrylamido-2-methylpropane sulfonic acid, 1-allyloxy-2-hydroxypropane sulfonic acid, vinylsulfonic acid, styrene sulfonic acid, alkyl allyl sulfosuccinic acid, sulphoethyl(meth)acrylate, phosphoalkyl(meth)acrylates such as phosphoethyl methacrylate (phosphate ester of 2-hydroxyethyl methacrylate), phosphoethyl acrylate, phosphopropyl(meth)acrylate, phosphobutyl(meth)acrylate, phosphate ester of polyethyleneglycol(meth)acrylate, phosphate ester of polypropyleneglycol(meth)acrylate, phosphoalkyl crotonates, phosphoalkyl maleates, phosphoalkyl fumarates, phosphodialkyl(meth)acrylates, phosphodialkyl crotonates, and allyl phosphate. Salts of these unsaturated strong acid monomers are also useful. Diesters and blends of monesters and diesters of the phosphate strong acids are useful also. The term "(meth)acrylate," and the like, as used throughout means either an acrylate, or a methacrylate, or mixtures of both. In a preferred embodiment, the ethylenically unsaturated strong acid monomer is a phosphorous-containing monomer, and especially an unsaturated phosphate ester such as phosphoethyl methacrylate (phosphate ester of 2-hydroxyethyl methacrylate).

According to the invention, the first monomer mixture comprises a total amount of at least 0.5% by weight weak acid monomers and strong acid monomers, provided to aid in the stability of the first-stage emulsion polymer formed. In other embodiments, the total amount of strong and weak acid monomers in the first polymerization mixture is from 0.5% to 5%, or from 1% to 3%, in each case by weight based on the weight of the monomers used in the first monomer mixture.

Strong acid monomer is used in the second polymerization stage in an amount of from about 0.5% to about 10%, or from about 0.5% to about 7.5%, or from about 1.0% to about 5.0%, in each case by weight based on the weight of the monomers used in the second polymerization stage. Weak acid monomer may be used in the second polymerization stage in an amount of from 0% to about 5%, or from 0% to about 2%, or from about 0% to 1%, in each case by weight based on the weight of the monomers used in the second polymerization stage.

The emulsion polymer may contain, in the first polymerization stage, from about 0% to about 10%, or from about 1% to about 7%, or from about 2% to about 5%, in each case by weight based on the weight of the monomers used in the first polymerization stage, of one or more ethylenically unsaturated monomers containing a keto group. The emulsion polymer may contain, in the second polymerization stage, from about 0.5% to about 10%, or from about 1% to about 7%, or from about 2% to about 5%, in each case by weight based on the weight of the monomers used in the second polymerization stage, of ethylenically unsaturated monomers containing a keto group.

As used herein, the terms "ethylenically unsaturated monomers containing a keto group" and "monomers containing a keto group" mean ethylenically unsaturated monomers that have one or more of ketone or aldehyde functionality. These monomers include, but are not limited to, diacetoneacrylamide, diacetonemethacrylamide, acetoacetoxyethyl(meth)acrylate, acetoacetoxypropyl(meth)acrylate, acetoacetoxybutyl(meth)acrylate, acrylamidomethylacetylacetone, allyl acetoacetate, and vinyl acetoacetate. In a preferred embodiment, the monomer containing a keto group is diacetoneacrylamide, providing keto groups that are useful for crosslinking.

The aqueous dispersions according to the invention may also include a crosslinker molecule, that can be, for example, a molecule containing multiple —NH2 or —NH— functionality, such as hydrazine, aliphatic polyamines such as ethylene diamine, propanediamine, butanediamine, hexanediamine, isophorone diamine, piperazine, diethylene triamine, dipropylene triamine, triethylene tetramine, and other such oligomers or polymers of ethylene diamine known as polyethylene amines (also known as polyaziradines or poly(ethyleneimines)), or a polyfunctional carboxylic hydrazide containing at least two hydrazide groups per molecule, such as adipic dihydrazide, oxalic dihydrazide, isophthalic dihydrazide, or polyacrylic polyhydrazide. Preferably, the polyfunctional carboxylic hydrazide is adipic dihydrazide. In various embodiments, the ratio of reactive amine or hydrazide groups to keto groups present in the emulsion may be from 0:1 to about 1.5:1, or from about 0.5:1 to about 1:1.

According to the invention, the calculated glass transition temperature (Tg) is at least 50° C. for the first monomer mixture polymerized in the first polymerization stage, and from −30 to 10° C. for the second monomer mixture polymerized in the second polymerization stage. Calculated Tg values as used herein are those calculated using the Fox equation (T. G. Fox, Bull. Am. Physics Soc. Volume 1, Issue No. 3, page 123 (1956), incorporated herein by reference), that is, for calculating the Tg of a copolymer of monomers (1) and (2):

$$1/Tg(calc.) = w(1)/Tg(1) + w(2)/Tg(2),$$

wherein
  Tg(calc.) is the glass transition temperature calculated for the copolymer;
  w(1) is the weight fraction of monomer (1) in the copolymer;
  w(2) is the weight fraction of monomer (2) in the copolymer;
  Tg(1) is the glass transition temperature of the homopolymer of monomer (1);
  Tg(2) is the glass transition temperature of the homopolymer of monomer (2).

The glass transition temperatures of homopolymers may be found, for example, in "Emulsion Polymerization and Emulsion Polymers", edited by P. A. Lovell and M. S. El-Aasser, John Wiley and Sons, 1997, incorporated herein by reference.

The calculated glass transition temperature (Tg) of the residues of the first monomer mixture are thus at least about 50° C., or at least about 60° C., or at least about 70° C. The calculated glass transition temperature (Tg) of the residues of the second polymerization stage are from about −30° C. to about 10° C., or from about −20 to about 0° C.

Generally, the weight ratio of the residues of the first stage with respect to the residues of the second stage is from about 20:80 to about 50:50, or from about 30:70 to about 40:60. The emulsion polymer typically has an average number particle size from about 50 to about 500 nanometers, or from about 50 to about 200 nanometers.

The present invention also provides a process for preparing a polymer dispersion, as described above, by a multi-stage emulsion polymerization process. The multi-stage emulsion polymer according to the invention is prepared by a multi-stage emulsion polymerization process, in which two stages differing in composition are polymerized in sequential fashion. Such a process is believed to result in the formation of two polymer compositions that are not entirely compatible, thereby resulting in the formation of two phases within the polymer particles. These particles may be composed of two phases of various geometries, such as, for example, core-shell particles, core-shell particles with shell phases incompletely encapsulating the core, core-shell particles with a multiplicity of cores, and interpenetrating network particles. Each of the stages of the multi-stage emulsion polymer may contain the same monomers, surfactants, chain transfer agents, etc., as disclosed elsewhere herein.

The multi-stage emulsion polymerization process may be carried out by first emulsifying and polymerizing the first monomer mixture, for the first polymerization stage, in an aqueous phase in the presence of surfactants and initiators, at suitable temperatures, such as, for example, from about 30° C. to about 95° C. Subsequently, the second polymerization stage is carried out by emulsion polymerizing the second monomer mixture in the presence of the first stage polymer, at suitable temperatures, for example, from 50° to 95° C., via initiators.

The invention may also be accomplished by introducing a portion of the first monomer mixture into the reaction vessel in which the emulsion polymerization is to be conducted in order to generate a seed particle, prior to adding the remainder of the first monomer mixture. Generally, this precharge is from about 3% to about 10% by weight of the total weight of the first and second stage monomer mixtures. Generation of these seed particles provides a means to control the particle size of the emulsion polymer. The seed particles can be added directly to the reaction vessel, i.e., prepared in a separate reaction, or may be generated in situ as described above. The process according to the invention may alternatively be carried out in the absence of a seed particle, or in the presence of a seed particle comprised of monomers different from those present in either the first or the second monomer mixtures.

The emulsion polymers according to the invention may be prepared in the presence or in the substantial absence of one or more support resins, as is known in the art. These support resins typically contain one or more acid-functional monomer residues, and are neutralized, for example with amines, in order to disperse the support resin in the reaction medium.

The polymers may likewise be prepared using one or more monomers that contribute to wet adhesion, as are known in the art, or in the substantial absence of such wet adhesion monomers. Useful wet adhesion monomers include methacrylamidoethyl ethylene urea, N-(2-methacryloxyethyl)ethylene urea, vinylimidazole, vinylpyrrolidone, 2-(1-imidazolyl)ethyl methacrylate, 2-(1-imidazolidin-2-on) ethyl methacrylate, N-(4-morpholino-methyl)acrylamide and methacrylamide, t-butylaminoethyl acrylate and methacrylate, dimethylaminoethyl acrylate and methacrylate, diethylaminoethyl acrylate and methacrylate, dimethylaminopropyl acrylate and methacrylate, and N-(dimethylamino) propyl acrylamide and methacrylamide.

Either thermal or redox initiation processes may be used. A suitable reaction temperature is from about 30° C. to about 95° C., preferably from about 50° to about 90° C. The monomer mixtures may be added neat, or as an emulsion in water.

The polymerizable compositions may further comprise, in the usual known amounts, surfactants, initiators, catalysts, chain transfer agents and other additives used in polymerization reactions known to those skilled in the art.

In the emulsion polymerization process according to the invention, conventional surfactants may be used, such as, for example, anionic and/or nonionic emulsifiers such as alkali metal or ammonium salts of alkylaryl sulfates, sulfonates or phosphates; alkyl sulfonic acids; sulfosuccinate salts; fatty acids and ethoxylated alcohols or phenols. "Reactive" surfactants may also be used, meaning emulsifiers bearing a pendant unsaturated functional group eligible to copolymerize with other commonly used monomers. The amount of surfactant used is usually 0.5 to 5% by weight, based on the weight of monomers, more preferably from 1 to 3% by weight, based on the weight of the monomers.

Conventional oil-soluble and/or, preferably, water-soluble free radical initiators may be used, such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, etc.

Redox systems using the same initiators, coupled with a suitable reductant, such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfite, hydrosulfide or dithionite, formadinesulfinic acid, hydroxymethanesulfonic acid, acetone bisulfite, etc., may be used.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion polymer, and/or to provide a different molecular weight distribution than would otherwise have been obtained with a given free radical initiator. Alkyl mercaptoalkanoates, such as isooctyl mercaptopropionate, and linear or branched $C_4$-$C_{22}$ alkyl mercaptans such as t-dodecyl mercaptan are preferred. Chain transfer agent(s) may be added in one or more additions or continuously, linearly or not, over most or all of the reaction period or during limited portion(s) of the reaction period. Preferred is the use of 0% to 1% by weight, or from 0 to 0.5%, based on total weight of monomers used to form the emulsion polymer.

The aqueous polymer dispersions may be neutralized with aqueous ammonia, or alkali metal or alkali-earth metal hydroxide solutions, and can be adjusted to a pH of from 5 to 11, or from 7 to 9. Aqueous ammonia solution is a preferred neutralization agent. The neutralization may be carried out either during the polymerization process or after the polymerization is finished.

The aqueous multi-stage polymer dispersions of the invention are generally employed in coating compositions that provide a protective finish or film on a substrate to which the coating composition has been applied.

The aqueous dispersions of the invention are contemplated to encompass coatings or paint compositions which are described in the art as clear coatings, flat coatings, satin coatings, semi-gloss coatings, gloss coatings, primers, textured coatings, and the like. The aqueous coating compositions of the invention are applied to a substrate. Substrates to which the aqueous dispersions of the invention may be applied include, for example, wood, plastic, metal, mineral substrates, previously painted or primed surfaces (fresh, aged, or weathered) and the like.

This invention can be further illustrated by the following examples of preferred embodiments thereof, although it will be understood that these examples are included merely for purposes of illustration and are not intended to limit the scope of the invention unless otherwise specifically indicated.

Experimental

Minimum Film Forming Temperature (MFFT), also called Minimum Filming Temperature (MFT), is the minimum temperature at which the latex forms a continuous film, as evidenced by a visual lack of cracking or powdery appearance of the film. As used herein, MFFT was measured according to ISO Test Method ISO 2115. According to the method, a polymer dispersion is dried at a suitable temperature gradient with a current of moisture-free air, and the temperature at which the coalesced (transparent) section of the film meets the uncoalesced (white) section is determined in (° C.).

Block Resistance Test

Block resistance measurements were determined using one of the following block resistance tests designated as either room temperature block resistance or hot-block resistance: Cast films of the test paints were prepared with a 120 µm Spiral film applicator (Model 358, available from Erichsen) on unsealed paper charts No. 2805 (available from BYK Gardner). Films were dried for 1 day at ambient temperature, and the films with card support were cut into two 4×4 cm squares. For the ROOM TEMPERATURE (RT) BLOCK RESISTANCE TEST, the squares were placed together (paint film against paint film), and a 2000 gram weight placed on the squares such that the weight was pressing with a force of 2000 g per 16 cm² (or 125 g/cm²). After 6 hours, the weights were removed and the squares separated by gently peeling from one another. For elevated temperature block, or the HOT-BLOCK RESISTANCE TEST, two 4×4 cm squares as described above were placed together (paint film against paint film), a 2000 gram weight (preheated to 50° C.) placed on the squares, and the weight and squares placed in a 50° C. oven. A set of squares and weight were removed from the oven after 30 minutes, 60 minutes, and 6 hours, the weights removed, and the samples allowed to cool to room temperature, and the squares separated. The block resistance was evaluated according to the following ratings:

| Block Rating | Type of Separation | Performance |
| --- | --- | --- |
| 0 | separation of films not possible | very poor |
| 1 | up to 25% film not damaged | very poor |
| 2 | 50 to 75% seal | very poor |
| 3 | 25 to 50% seal | poor |
| 4 | 5 to 25% seal | poor to fair |
| 5 | 0 to 5% seal (areal damage) | fair |
| 6 | moderate tack; higher number of point damage through the coating film to the substrate | fair to good |
| 7 | slight tack; few damages on the coating surface only | good |
| 8 | slight tack; higher pressure required | very good |
| 9 | very slight tack; slight pressure required | excellent |
| 10 | no tack; falls apart spontaneously or if shaken | perfect |

Elongation was measured using ASTM Test Method D 1708. According to the method, elongation is measured as the increase in the length (in %) in the gauge length of the test specimen by a tensile load. The test specimens are prepared by cutting out from free sheet, dimension of the specimen is described at the ASTM D 1708 and the film thickness is about 200 µm, dry.

Water uptake was measured as follows: Free films of the aqueous coating composition were exposed to distilled water for 24 hours at 23° C. The effect of immersion (swelling) was evaluated by weighing (in %). The specimens were prepared from free film by shearing, the shape of the specimens was square (5×5 cm) and thickness about 200 µm, dry.

König hardness was measured using ISO Test Method 1522. According to the method, the test aqueous coating composition was applied using a 120 µm film applicator. The film was then allowed to dry for 7 days at 23° C. and 50% relative humidity. After the film was dried, the film was tested for pendulum hardness using Pendulum König apparatus (i.e. BRAIVE Instruments). Record the average hardness in (s).

Film formation at low temperature tests the ability of a paint to film at 5° C., and was measured as follows: Drew down the test paint with a 250 µm film applicator on a glass and/or wooden substrate. Immediately placed the film into the CTS Climate Cabinet and dried for 24 hours at 5° C. and 50% relative humidity. Rated for cracking on this scale:

| | |
| --- | --- |
| excellent | no cracks |
| good | isolated very small cracks (size of cracks approx. 1 mm) |
| fair | isolated small cracks (size of cracks approx. 1 cm) |
| poor | totally cracked film |

Gloss of the coating film was measured by drawing down a 120 µm wet sample on black glass. The film was dried at 23° C. and 50% relative humidity for 24 hours. Gloss was then measured at an angle of reflection of 20 degrees and 60 degrees, using a glossmeter (i.e. Q-gloss 3, Pausch Messtechnic GmbH). Take at least 3 measurements at each appropriate angle. Record the average gloss in (%).

EXAMPLES

Example 1

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 0° C.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate; as used herein throughout, available as T-MULZ® 1228, a product of Harcros Chemicals, Inc., 5200 Speaker Road, Kansas City, Kans. 66106), 15 g diacetone acrylamide, 2.9 g of 25% aqueous ammonia, 35.1 g 2-ethylhexyl acrylate, and 246.2 g methyl methacrylate. The calculated Tg was +73° C.

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 205.6 g methyl methacrylate. The calculated Tg was −10° C.

Example 2

Single-stage Polymer (Comparative)

To a 2000 mL resin kettle equipped with a condenser, nitrogen purge and feed tubes were added 472 g of DI water, 24 g of a 30% solution of fatty alcohol ether (12 EO units) sulfate Na salt and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The monomer pre-emulsion charge was fed over about 170 mins. An initiator charge of 4.0 g of APS in 64.0 g of DI water was also begun and fed at 8.30 g/min. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 14° C.

The stable monomer pre-emulsion was prepared by mixing the following components: 253.6 g DI water, 48.0 g of a 30% solution of fatty alcohol ether (12 EO units) sulfate Na salt, 3.0 g methacrylic acid, 14.2 g phosphoethyl methacrylate (phosphate ester of 2-hydroxyethyl methacrylate), 43.1 g diacetone acrylamide, 8.1 g of 25% aqueous ammonia, 352.7 g 2-ethylhexyl acrylate and 451.8 g methyl methacrylate. The calculated Tg was +14° C.

Example 3

Inverted Multi-stage Polymer (Comparative)

To a 2000 mL resin kettle equipped with a condenser, nitrogen purge and feed tubes were added 472 g of DI water, 24 g grams of a 30% solution of fatty alcohol ether (12 EO units) sulfate Na salt and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 110 mins. An initiator charge of 4.0 g of APS in 64.0 g of DI water was also begun and fed at 8.30 g/min. After the first stage addition was completed, the second stage monomer pre-emulsion charge was begun and fed over about 60 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 0° C.

The stable first stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 205.6 g methyl methacrylate. The calculated Tg was −10° C.

The stable second stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +73° C.

Example 4

Blend of Two Single-stage Polymers (Comparative)

Example 4A

Single-stage Hard Polymer

To a 2000 mL resin kettle equipped with a condenser, nitrogen purge and feed tubes were added 472 g of DI water, 24 g grams of a 30% solution of fatty alcohol ether (12 EO units) sulfate Na salt and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The monomer pre-emulsion charge was fed over about 170 mins. An initiator charge of 4.0 g of APS in 64.0 g of DI water was also begun and fed at 8.30 g/min. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 7.8, and the MFFT was >90° C.

The stable monomer pre-emulsion was prepared by mixing the following components: 253.6 g DI water, 48.0 g of a 30% solution of fatty alcohol ether (12 EO units) sulfate Na salt, 8.6 g methacrylic acid, 8.6 g phosphoethyl methacrylate (phosphate ester of 2-hydroxyethyl methacrylate), 43.1 g diacetone acrylamide, 8.1 g of 25% aqueous ammonia, 100.3 g 2-ethylhexyl acrylate, and 703.9 g methyl methacrylate. The calculated Tg was +73° C.

Example 4B

Single-stage Soft Polymer

To a 2000 mL resin kettle equipped with a condenser, nitrogen purge and feed tubes were added 472 g of DI water, 24 g grams of a 30% solution of fatty alcohol ether (12 EO units) sulfate Na salt and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The monomer pre-emulsion charge was fed over about 170 mins. An initiator charge of 4.0 g of APS in 64.0 g of DI water was also begun and fed at 8.30 g/min. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.3 and the MFFT was about 0° C.

The stable monomer pre-emulsion was prepared by mixing the following components: 253.6 g DI water, 48.0 g of a 30% solution of fatty alcohol ether (12 EO units) sulfate Na salt, 17.2 g phosphoethyl methacrylate (phosphate ester of 2-hydroxyethyl methacrylate), 43.1 g diacetone acrylamide, 8.1 g of 25% aqueous ammonia, 488.5 g 2-ethylhexyl acrylate, and 315.6 g methyl methacrylate. The calculated Tg was −10° C.

The Examples 4A and 4B were mixed in a ratio 35:65 (wt. %) to get the same overall monomer composition as in Example 1. The solids content in this latex blend was about 46.0%, the pH about 8.0, and the MFFT was about 0° C.

Example 5

Preparation of a Solvent-free Transparent Coating Composition

A transparent coating composition was prepared by mixing the components listed in Table 1.

TABLE 1

| weight parts | component | note |
|---|---|---|
| 83.59 | latex | Example 1, 2, 3, 4 |
| 14.86 | water | |
| 0.10 | 25% aqueous ammonia | |
| 0.50 | Tego Wet 500 | Wetting agent (TEGO) |
| 0.15 | Mergal K9N | Biocide (TROY) |
| 0.20 | BYK 024 | Defoamer (BYK) |
| 1.00 | Acrysol RM 2020 | Thickener (Rohm and Haas) |

The components were mixed at room temperature with stirring to form a transparent coating composition. In Table 2 the properties of solvent free transparent coating composition films are listed.

TABLE 2

| | Example 1 | Example 2 | Example 3 | Example 4 |
|---|---|---|---|---|
| RT block resistance | | | | |
| 125 g/cm² - 6 hours at 23° C. | 10 | 6 | 10 | 10 |
| Hot-block resistance | | | | |
| 125 g/cm² - 30 minutes at 50° C. | 10 | 5 | 10 | 10 |
| 125 g/cm² - 60 minutes at 50° C. | 10 | 4 | 9 | 9 |
| 125 g/cm² - 6 hours at 50° C. | 10 | 3 | 5 | 7 |
| Elongation (%) | 120 | 100 | 115 | 150 |
| Water uptake (%) | 8 | 9 | 8 | 14 |
| König hardness (s) | 40 | 55 | 43 | 25 |
| Film formation at low temperature(5° C./50% R.H.) | excellent | poor | good | excellent |

Example 6

Preparation of Solvent-free White Gloss Paint

A white gloss paint was prepared by mixing the following components:

TABLE 3

| weight parts | component | note |
|---|---|---|
| Pigment paste | | |
| 10.00 | water | |
| 0.20 | 25% aqueous ammonia | |
| 1.20 | Edaplan 480 | Dispersant (Münzing Chemie) |
| 0.50 | Tego Wet 500 | Wetting agent (TEGO) |
| 0.15 | Tego Foamex 805 | Defoamer (TEGO) |
| 20, 50 | Kronos 2190 | Titanium dioxide (Kronos) |
| Let down | | |
| 58.40 | latex | Example 1, 2, 3, 4 |
| 7.90 | water | |
| 0.15 | Mergal K9N | Biocide (TROY) |
| 0.05 | Tego Foamex 805 | Defoamer (TEGO) |
| 2.00 | Acrysol RM 2020 | Thickener (Rohm and Haas) |

Characteristics:
Solids content: ~50%
Pigment volume concentration (PVC): ~17%

The components of the pigment paste were mixed in the order listed in Table 3 at room temperature and subsequently dispersed for about 10 minutes in a dissolver at about 4,000 rpm and with an appropriate wessel/dissolver disk geometry. After cooling of the pigment paste, the components of the let down were each added in the order listed in Table 3 with thorough stirring. Stirring was continued until a homogeneous mixture had been formed.

In Table 4 the properties of the solvent-free white gloss paint films are listed.

TABLE 4

| | Example 1 | Example 2 | Example 3 | Example 4 |
|---|---|---|---|---|
| RT block resistance | | | | |
| 125 g/cm² - 6 hours at 23° C. | 10 | 7 | 10 | 10 |

TABLE 4-continued

|  | Example 1 | Example 2 | Example 3 | Example 4 |
|---|---|---|---|---|
| Hot-block resistance |  |  |  |  |
| 125 g/cm² - 30 minutes at 50° C. | 10 | 6 | 10 | 10 |
| 125 g/cm² - 60 minutes at 50° C. | 10 | 4 | 9 | 9 |
| 125 g/cm² - 6 hours at 50° C. | 10 | 3 | 6 | 7 |
| Elongation (%) | 80 | 60 | 85 | 115 |
| Water uptake (%) | 6 | 7 | 8 | 12 |
| König hardness (s) | 42 | 53 | 42 | 23 |
| Gloss on glass (at 60°/20°) | 82/53% | 78/45% | 77/46% | 77/40% |
| Film formation at low temperature(5° C./ 50% R.H.) | excellent | poor | good | excellent |

Example 7

To a 2000 mL resin kettle equipped with a condenser, nitrogen purge and feed tubes were added 472 g of DI water, 24 g of a 30% solution of fatty alcohol ether (12 EO units) sulfate Na salt and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 µm screen. The solids content in this latex was about 46.0%, the pH about 8.2, and the MFFT was about 0° C.

The stable first stage monomer pre-emulsion was prepared by mixing the following components: 93.0 g DI water, 17.1 g of a 30% solution of fatty alcohol ether (12 EO units) sulfate Na salt, 6.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +72° C.

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 205.6 g methyl methacrylate. The calculated Tg was −10° C.

Examples 8 to 10

Phosphoethyl Methacrylate (Phosphate Ester of 2-hydroxyethyl Methacrylate) Amount Variation To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 µm screen. The solids content in this latex was about 46.0%, the pH and the MFFT are listed in Table 5.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +73° C.

The stable second stage monomer pre-emulsion was prepared by mixing the following components: 160.6 g DI water, 30.9 g of a 30% solution of fatty alcohol ether (12 EO units) sulfate Na salt, $(x)_g$ phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and $(216.5-x)_g$ methyl methacrylate.

TABLE 5

|  | Example 8 | Example 1 | Example 9 | Example 10 |
|---|---|---|---|---|
| x (g) | 0 | 11.2 | 28.1 | 39.4 |
| Wt. % based on second stage polymer | 0 (2% MAA) | 2 | 5 | 7 |
| Tg calculated - second stage | −9° C. | −10° C. | −10° C. | −11° C. |
| pH | 7.5 | 8.0 | 5, 9 | 5, 5 |
| MFFT | ~0° C. | ~0° C. | ~0° C. | ~0° C. |

Example 11

A transparent coating composition as described in Table 1 of Example 5 was prepared with Examples 7, 8, 9, and 10. In Table 6, the properties of the solvent-free transparent coating composition films are listed.

TABLE 6

|  | Example 1 | Example 7 | Example 8 | Example 9 | Example 10 |
|---|---|---|---|---|---|
| RT block resistance |  |  |  |  |  |
| 125 g/cm² - 6 hours at 23° C. | 10 | 10 | 10 | 10 | 10 |
| Hot-block resistance |  |  |  |  |  |
| 125 g/cm² - 30 8minutes at 50° C. | 10 | 10 | 10 | 10 | 10 |
| 125 g/cm² - 60 minutes at 50° C. | 10 | 10 | 10 | 10 | 10 |
| 125 g/cm² - 6 hours at 50° C. | 10 | 10 | 10 | 10 | 10 |
| Elongation (%) | 120 | 110 | 110 | 95 | 95 |
| Water uptake (%) | 8 | 8 | 13 | 10 | 14 |
| König hardness (s) | 40 | 40 | 40 | 45 | 49 |
| Film formation at low temperature (5° C./50% R.H.) | excellent | excellent | good | excellent | excellent |

Examples 12 to 17

DAAM Amount Variation

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with $(z)_g$ of 9.3% aqueous solution of adipic dihydrazide. The emulsion was mixed for 15 minutes and cooled down and filtered through a 100 μm screen. The solids content in this latex, the pH and the MFFT are listed in Table 7.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), $(x)_g$ diacetone acrylamide, 2.9 g of 25% aqueous ammonia, 35.1 g 2-ethylhexyl acrylate, and $(261.2-x)_g$ methyl methacrylate. The calculated Tg was about +73° C. (from +72° C. for 10% DAAM to +74° C. for 0% DAAM).

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), $(y)_g$ diacetone acrylamide, 5.2 g of 25% aqueous ammonia, 317.6 g 2-ethylhexyl acrylate, and $(233.7-y)_g$ methyl methacrylate. The calculated Tg was about –10° C. (from –9° C. for 0% DAAM to –10° C. for 10% DAAM).

TABLE 7

|  | Example 12(Comp.) | Example 13 | Example 14 | Example 15 | Example 1 | Example 16 | Example 17 |
|---|---|---|---|---|---|---|---|
| x (g) | 0 | 6.0 | 9.0 | 12.0 | 15.0 | 22.7 | 30.2 |
| Wt. % based on first stage polymer | 0 | 2 | 3 | 4 | 5 | 7.5 | 10 |
| y (g) | 0 | 11.2 | 16.9 | 22.5 | 28.1 | 42.2 | 56.3 |
| Wt. % based on second stage polymer | 0 | 2 | 3 | 4 | 5 | 7.5 | 10 |
| z (g) | 0 | 83.6 | 125.9 | 167.7 | 209.5 | 315.4 | 420.1 |
| Solids content | 50.5 | 48.8 | 47.9 | 47.0 | 46.0 | 44.3 | 42.6 |
| MFFT | 8.0° C. | ~0° C. | ~0° C. | ~0° C. | ~0° C. | ~0° C. | ~0° C. |

Example 18

A transparent coating composition as described in Table 1 of Example 5 was prepared with Examples 12 (Comp.), 13, 14, 15, 16, and 17. In Table 8 the properties of solvent free transparent coating composition films are listed.

TABLE 8

|  | Example 12 | Example 13 | Example 14 | Example 15 | Example 1 | Example 16 | Example 17 |
|---|---|---|---|---|---|---|---|
| RT block resistance |  |  |  |  |  |  |  |
| 125 g/cm² - 6 hours at 23° C. | 10 | 10 | 10 | 10 | 10 | 10 | 10 |
| Hot-block resistance |  |  |  |  |  |  |  |
| 125 g/cm² - 30 minutes at 50° C. | 7 | 10 | 10 | 10 | 10 | 10 | 10 |
| 125 g/cm² - 60 minutes at 50° C. | 7 | 7 | 9 | 10 | 10 | 10 | 10 |
| 125 g/cm² - 6 hours at 50° C. | 5 | 7 | 7 | 10 | 10 | 10 | 10 |
| Elongation (%) | 160 | 140 | 140 | 120 | 120 | 80 | 60 |
| Water uptake (%) | 21 | 13 | 10 | 8 | 8 | 8 | 8 |
| König hardness (s) | 27 | 30 | 35 | 40 | 40 | 45 | 50 |
| Film formation at low temperature (5° C./50% R.H.) | fair | good | excellent | excellent | excellent | excellent | excellent |

Examples 19 to 22

Hard to Soft Stage Ratio Variation

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about x mins. An initiator charge of 4.0 g of APS in 64.0 g of DI water was also begun and fed at 8.30 g/min. After the first stage addition was completed, the second stage monomer pre-emulsion charge was begun and fed over about y mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in these latexes were about 46.0%, the pH about 8.0 and the MFFTs are listed in Table 9.

The composition of first and second stage monomer pre-emulsions are listed in Table 9. The calculated Tgs of the first stage were +73° C. The calculated Tgs of the second stage were −10° C.

TABLE 9

|  | Example 4B | Example 19 | Example 1 | Example 20 | Example 21 | Example 22 | Example 4A |
|---|---|---|---|---|---|---|---|
| First stage monomer pre-emulsion composition (g) |  |  |  |  |  |  |  |
| DI water | — | 79.7 | 93.0 | 106.3 | 119.5 | 130.0 | 253.6 |
| surfactant | — | 14.6 | 17.1 | 19.5 | 22.0 | 24.4 | 48.0 |
| MAA | — | 2.6 | 3.0 | 3.4 | 3.9 | 4.3 | 8.6 |
| PEMA | — | 2.6 | 3.0 | 3.4 | 3.9 | 4.3 | 8.6 |
| DAAM | — | 12.8 | 15.0 | 17.1 | 19.3 | 21.4 | 43.1 |
| 25% ammonia | — | 2.5 | 2.9 | 3.3 | 3.7 | 4.1 | 8.1 |
| 2-EHA | — | 30.1 | 35.1 | 40.0 | 45.1 | 50.1 | 100.3 |
| MMA | — | 211.0 | 246.2 | 281.4 | 316.5 | 351.7 | 703.9 |
| Feed time x (min.) | — | 50 | 60 | 70 | 75 | 85 | 170 |
| Second stage monomer pre-emulsion composition (g) |  |  |  |  |  |  |  |
| DI water | 253.6 | 173.0 | 160.6 | 148.2 | 135.9 | 126.3 | — |
| surfactant | 48.0 | 33.3 | 30.9 | 28.5 | 26.1 | 23.7 | — |
| PEMA | 17.2 | 12.1 | 11.2 | 10.3 | 9.5 | 8.6 | — |
| DAAM | 43.1 | 30.3 | 28.1 | 25.9 | 23.8 | 21.6 | — |
| 25% ammonia | 8.1 | 5.6 | 5.2 | 4.8 | 4.4 | 4.0 | — |
| 2-EHA | 488.5 | 342.0 | 317.6 | 293.2 | 268.7 | 244.3 | — |
| MMA | 315.6 | 221.4 | 205.6 | 189.8 | 174.0 | 158.2 | — |
| Feed time y (min.) | 170 | 120 | 110 | 100 | 95 | 85 | — |
| hard/soft ratio | 0/100 | 30/70 | 35/65 | 40/60 | 45/55 | 50/50 | 100/0 |
| MFFT | ~0° C. | ~0° C. | ~0° C. | 5° C. | 15° C. | 50° C. | >90° C. |

Example 23

Transparent coating compositions, as described in Table 1 of Example 5, were prepared with Examples 4A, 4B, 20, 21, 22, and 23. In Table 10 the properties of solvent free transparent coating composition films are listed.

TABLE 10

|  | Example 4B | Example 20 | Example 1 | Example 21 | Example 22 | Example 23 | Example 4A |
|---|---|---|---|---|---|---|---|
| RT block resistance |  |  |  |  |  |  |  |
| 125 g/cm² - 6 hours at 23° C. | 5 | 10 | 10 | 10 | 10 |  |  |
| Hot-block resistance |  |  |  |  |  | does not form | does not form |
| 125 g/cm² - 30 minutes at 50° C. | 4 | 10 | 10 | 10 | 10 | a continuous | a continuous |
| 125 g/cm² - 60 minutes at 50° C. | 4 | 9 | 10 | 10 | 10 | film at room | film at room |
| 125 g/cm² - 6 hours at 50° C. | 2 | 8 | 10 | 10 | 9 | temperature | temperature |
| Elongation (%) | 350 | 140 | 120 | 100 | 85 |  |  |
| Water uptake (%) | 7 | 8 | 8 | 12 | 16 |  |  |
| König hardness (s) | 5 | 30 | 40 | 47 | 53 |  |  |
| Film formation at low temperature (5° C./50% R.H.) | excellent | excellent | excellent | good | poor |  |  |

Examples 24 to 27

Second-stage Tg Variation

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in these latexes were about 46.0%, the pH about 8.0, and the MFFTs are listed in Table 11. The composition of first and second stage monomer pre-emulsions are listed in Table 11. The calculated Tg of the first stage was +73° C.

TABLE 11

|  | Example 24 | Example 25 | Example 1 | Example 26 | Example 27 |
|---|---|---|---|---|---|
| First stage monomer pre-emulsion composition |  |  |  |  |  |
| DI water |  |  | 93.0 |  |  |
| surfactant |  |  | 17.1 |  |  |
| MAA |  |  | 3.0 |  |  |
| PEMA |  |  | 3.0 |  |  |
| DAAM |  |  | 15.0 |  |  |
| 25% ammonia |  |  | 2.9 |  |  |
| 2-EHA |  |  | 35.1 |  |  |
| MMA |  |  | 246.2 |  |  |
| Second stage monomer pre-emulsion compsition |  |  |  |  |  |
| DI water | 160.6 | 160.6 | 160.6 | 160.6 | 160.6 |
| surfactant | 30.9 | 30.9 | 30.9 | 30.9 | 30.9 |
| PEMA | 11.2 | 11.2 | 11.2 | 11.2 | 11.2 |
| DAAM | 28.1 | 28.1 | 28.1 | 28.1 | 28.1 |
| 25% ammonia | 5.2 | 5.2 | 5.2 | 5.2 | 5.2 |
| 2-EHA | 410.7 | 365.7 | 317.6 | 284.2 | 247.6 |
| MMA | 112.5 | 157.5 | 205.6 | 239.1 | 275.6 |
| Calculated Tg of second stage polymer | −30° C. | −20° C. | −10° C. | 0° C. | 10° C. |
| MFFT | ~0° C. | ~0° C. | ~0° C. | 5° C. | 25° C. |

Example 28

A transparent coating composition as described in Table 1 was prepared with Examples 24, 25, 26, and 27. In Table 12 the properties of solvent-free transparent coating composition films are listed.

TABLE 12

|  | Example 24 | Example 25 | Example 1 | Example 26 | Example 27 |
|---|---|---|---|---|---|
| RT block resistance |  |  |  |  |  |
| 125 g/cm² - 6 hours at 23° C. | 10 | 10 | 10 | 10 | 10 |
| Hot-block resistance |  |  |  |  |  |
| 125 g/cm² - 30 minutes at 50° C. | 10 | 10 | 10 | 10 | 10 |
| 125 g/cm² - 60 minutes at 50° C. | 9 | 10 | 10 | 10 | 10 |
| 125 g/cm² - 6 hours at 50° C. | 8 | 10 | 10 | 9 | 9 |
| Elongation (%) | 160 | 140 | 120 | 105 | 30 |
| Water uptake (%) | 10 | 9 | 8 | 9 | 13 |
| König hardness (s) | 18 | 33 | 40 | 47 | 56 |
| Film formation at low temperature (5° C./50% R.H.) | excellent | excellent | excellent | good | poor |

Examples 29 to 32

ADH Amount Variation

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with different amount of adipic dihydrazide dissolved in DI water (9.3% aqueous solution). The amounts of ADH used for this treatment are listed in Table 13. The emulsion was mixed for 15 minutes and cooled down and filtered through a 100 μm screen. The solids content in these latexes and the MFFTs are listed in Table 13.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +73° C.

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 205.6 g methyl methacrylate. The calculated Tg was −10° C.

TABLE 13

|  | Example 29 | Example 30 | Example 31 | Example 32 | Example 1 |
|---|---|---|---|---|---|
| amount of ADH (g) | 0 | 5.2 | 10.5 | 15.7 | 19.5 |
| Solids content | 50.8 | 49.3 | 48.1 | 46.9 | 46.0 |
| MFFT | ~0° C. | ~0° C. | ~0° C. | ~0° C. | ~0° C. |

Example 33

A transparent coating composition as described in Table 1 was prepared with Examples 29, 30, 31, and 32. In Table 14 the properties of solvent free transparent coating composition films are listed.

TABLE 14

|  | Example 29 | Example 30 | Example 31 | Example 32 | Example 1 |
|---|---|---|---|---|---|
| RT block resistance |  |  |  |  |  |
| 125 g/cm² - 6 hours at 23° C. | 10 | 10 | 10 | 10 | 10 |
| Hot-block resistance |  |  |  |  |  |
| 125 g/cm² - 30 minutes at 50° C. | 10 | 10 | 10 | 10 | 10 |
| 125 g/cm² - 60 minutes at 50° C. | 7 | 7 | 10 | 10 | 10 |
| 125 g/cm² - 6 hours at 50° C. | 7 | 7 | 9 | 10 | 10 |

TABLE 14-continued

|  | Example 29 | Example 30 | Example 31 | Example 32 | Example 1 |
|---|---|---|---|---|---|
| Elongation (%) | 160 | 140 | 120 | 125 | 120 |
| Water uptake (%) | 9 | 9 | 8 | 9 | 8 |
| König hardness (s) | 33 | 34 | 36 | 38 | 40 |
| Film formation at low temperature (5° C./50% R.H.) | excellent | excellent | excellent | excellent | excellent |

Examples 34 to 36

BA Instead of 2-EHA—Second-stage Tg Variation

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in these latexes were about 46.0%, the pH about 8.0, and the MFFTs are listed in Table 15. The composition of first and second stage monomer pre-emulsions were listed in Table 15.

TABLE 15

|  | Example 34 | Example 35 | Example 36 |
|---|---|---|---|
| First stage monomer pre-emulsion composition | | | |
| DI water | 93.0 | | |
| surfactant | 17.1 | | |
| MAA | 3.0 | | |
| PEMA | 3.0 | | |
| DAAM | 15.0 | | |
| 25% ammonia | 2.9 | | |
| BA | 35.1 | | |
| MMA | 246.2 | | |
| Calculated Tg of first stage polymer | +77° C. | | |
| Second stage monomer pre-emulsion composition | | | |
| DI water | 160.6 | 160.6 | 160.6 |
| surfactant | 30.9 | 30.9 | 30.9 |
| PEMA | 11.2 | 11.2 | 11.2 |
| DAAM | 28.1 | 28.1 | 28.1 |
| 25% ammonia | 5.2 | 5.2 | 5.2 |
| BA | 354.4 | 337.6 | 317.6 |
| MMA | 168.8 | 185.6 | 205.6 |
| Calculated Tg of second stage polymer | −6° C. | −2° C. | +3° C. |
| MFFT | ~0° C. | 1.5° C. | 6.0° C. |

Example 37

BA Latex—BA/MMA Partially Replaced with BMA

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 3° C.

The stable first stage monomer pre-emulsion was prepared by mixing the following components: 93.0 g DI Water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 12.1 g n-butyl acrylate, 45.4 g n-butyl methacrylate, and 223.8 g methyl methacrylate. The calculated Tg was +82° C.

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 281.3 g n-butyl acrylate, 84.4 g n-butyl methacrylate, and 157.5 g methyl methacrylate. The calculated Tg was +4° C.

Example 38

A transparent coating composition, as described in Table 1, was prepared with Examples 34, 35, 36, and 37. In Table 16 the properties of the resulting solvent-free transparent coating composition films are listed.

TABLE 16

|  | Example 34 | Example 35 | Example 36 | Example 37 |
|---|---|---|---|---|
| RT block resistance |  |  |  |  |
| 125 g/cm² - 6 hours at 23° C. | 10 | 10 | 10 | 10 |
| Hot-block resistance |  |  |  |  |
| 125 g/cm² - 30 minutes at 50° C. | 10 | 10 | 10 | 10 |
| 125 g/cm² - 60 minutes at 50° C. | 10 | 10 | 10 | 10 |
| 125 g/cm² - 6 hours at 50° C. | 10 | 10 | 9 | 10 |
| Elongation (%) | 120 | 120 | 120 | 130 |
| Water uptake (%) | 10 | 9 | 8 | 7 |
| König hardness (s) | 43 | 45 | 48 | 51 |
| Film formation at low temperature(5° C./ 50% R.H.) | excellent | excellent | good | good |

Examples 39 to 42

Styrene Instead of MMA

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in these latexes were about 46.0%, the pH about 8.0, and the MFFTs are listed in Table 17. The composition of first and second stage monomer pre-emulsions were listed in Table 17.

TABLE 17

|  | Example 39 | Example 40 | Example 41 | Example 42 |
|---|---|---|---|---|
| First stage monomer pre-emulsion composition |  |  |  |  |
| DI water | 93.0 | 93.0 | 93.0 | 93.0 |
| surfactant | 17.1 | 17.1 | 17.1 | 17.1 |
| MAA | 3.0 | 3.0 | 3.0 | 3.0 |
| PEMA | 3.0 | 3.0 | 3.0 | 3.0 |
| DAAM | 15.0 | 15.0 | 15.0 | 15.0 |
| 25% ammonia | 2.9 | 2.9 | 2.9 | 2.9 |
| 2-EHA | 35.1 | 35.1 | 35.1 | 35.1 |
| MMA | 246.2 | — | — | 123.1 |
| Styrene | — | 246.2 | 246.2 | 123.1 |
| Calculated Tg of first stage polymer | +73° C. | +75° C. | +75° C. | +74° C. |
| Second stage monomer pre-emulsion composition |  |  |  |  |
| DI water | 160.6 | 160.6 | 160.6 | 160.6 |
| surfactant | 30.9 | 30.9 | 30.9 | 30.9 |

TABLE 17-continued

|  | Example 39 | Example 40 | Example 41 | Example 42 |
|---|---|---|---|---|
| PEMA | 11.2 | 11.2 | 11.2 | 11.2 |
| DAAM | 28.1 | 28.1 | 28.1 | 28.1 |
| 25% ammonia | 5.2 | 5.2 | 5.2 | 5.2 |
| 2-EHA | 317.6 | 317.6 | 317.6 | 317.6 |
| MMA | — | 205.6 | — | 102.8 |
| Styrene | 205.6 | — | 205.6 | 102.8 |
| Calculated Tg of second stage polymer | −9° C. | −10° C. | −9° C. | −9° C. |
| MFFT | ~0° C. | ~0° C. | ~0° C. | ~0° C. |

Example 43

A transparent coating composition as described in Table 1 was prepared with Examples 39, 40, 41 and 42. In Table 18 the properties of solvent free transparent coating composition films are listed.

TABLE 18

|  | Example 39 | Example 40 | Example 41 | Example 42 |
|---|---|---|---|---|
| RT block resistance |  |  |  |  |
| 125 g/cm² - 6 hours at 23° C. | 10 | 10 | 10 | 10 |
| Hot-block resistance |  |  |  |  |
| 125 g/cm² - 30 minutes at 50° C. | 10 | 10 | 10 | 10 |
| 125 g/cm² - 60 minutes at 50° C. | 10 | 7 | 10 | 10 |
| 125 g/cm² - 6 hours at 50° C. | 10 | 7 | 7 | 9 |

Examples 44 to 47

Reactive Surfactants

To a 2000 mL resin kettle equipped with a condenser, nitrogen purge and feed tubes were added 460 g of DI water, 36 g of a 20% aqueous solution of the reactive surfactant listed in Table 19, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex, pH and MFFT as well as different reactive surfactant types are listed in Table 19.

The stable first stage monomer pre-emulsion was prepared by mixing the following components: 84.5 g DI water, 25.6 g of a 20% aqueous solution of a reactive surfactant listed in Table 19, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +73° C.

The stable second stage monomer pre-emulsion was prepared by mixing the following components: 145.2 g DI water, 46.3 g of a 20% aqueous solution of reactive surfactant, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 205.6 g methyl methacrylate. The calculated Tg was −10° C.

TABLE 19

|  | Example 44 | Example 45 | Example 46 | Example 47 |
| --- | --- | --- | --- | --- |
| Reactive surfactant trade name | Hitenol BC-20 [1] | Hitenol KH-10 [2] | Adeka Reasoap SE-10 [3] | Adeka Reasoap SR-10 [4] |
| Solids content | 46.0 | 46.0 | 46.0 | 46.0 |
| MFFT | ~0° C. | ~0° C. | ~0° C. | ~0° C. |

[1] ... Poly(oxy-1,2-ethanediyl), α-sulfo-ω-[4-nonyl-2-(1-propenyl)phenoxy], branched, ammonium salt
[2] ... α-sulfo-ω-[1-alkyl-2-(2-propenyloxy)ethoxy]-poly(oxy-1,2-ethanediyl), ammonium salt
[3] ... α-sulfo-ω-[1-[(nonylphenoxy)methyl]-2-(2-propenyloxy)ethoxy]-poly(oxy-1,2-ethanediyl), ammonium salt
[4] ... α-sulfo-ω-[1-(alkoxy)methyl-2-(2-propenyloxy)ethoxy]-poly(oxy-1,2-ethanediyl), ammonium salt Example 48

A transparent coating composition, as described in Table 1, was prepared with Examples 44, 45, 46, 47, and 48. In Table 20 the properties of solvent free transparent coating composition films are listed.

TABLE 20

|  | Example 44 | Example 45 | Example 46 | Example 47 |
| --- | --- | --- | --- | --- |
| RT block resistance |  |  |  |  |
| 125 g/cm² - 6 hours at 23° C. | 10 | 10 | 10 | 10 |
| Hot-block resistance |  |  |  |  |
| 125 g/cm² - 30 minutes at 50° C. | 10 | 10 | 10 | 10 |
| 125 g/cm² - 60 minutes at 50° C. | 10 | 10 | 10 | 10 |
| 125 g/cm² - 6 hours at 50° C. | 10 | 10 | 10 | 10 |

TABLE 20-continued

|  | Example 44 | Example 45 | Example 46 | Example 47 |
| --- | --- | --- | --- | --- |
| Film formation at low temperature (5° C./50% R.H.) | excellent | excellent | excellent | excellent |

Examples 49 to 52

Other Phosphate Monomers

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 0° C.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g of a phosphate monomer as listed in Table 21, 15 g diacetone acrylamide, 2.9 g of 25% aqueous ammonia, 35.1 g 2-ethylhexyl acrylate, and 246.2 g methyl methacrylate. The calculated Tg was about +73° C.

The stable second stage monomer pre-emulsion was prepared by mixing the following components: 160.6 g DI water, 30.9 g of a 30% solution of fatty alcohol ether (12 EO units) sulfate Na salt, 11.2 g phosphate monomer, 28.1 g diacetone acrylamide, 5.2 g of 25% aqueous ammonia, 317.6 g 2-ethylhexyl acrylate, and 205.6 g methyl methacrylate. The calculated Tg was about −10° C.

TABLE 21

|  | Example 49 | Example 50 | Example 51 | Example 52 |
| --- | --- | --- | --- | --- |
| Phosphate monomer | Phosphate ester of polyethyleneglycol methacrylate | Phosphate ester of polypropyleneglycol methacrylate | Phosphate ester of 2-hydroxyethyl acrylate | Phosphate ester of 4-hydroxy-butyl acrylate |
| Solids content | 46.0 | 46.0 | 46.0 | 46.0 |
| MFFT | ~0° C. | ~0° C. | ~0° C. | ~0° C. |

Example 53

A transparent coating composition, as described in Table 1, was prepared with Examples 49, 50, 51, and 52. In Table 22 the properties of the resulting solvent-free transparent coating composition films are listed:

TABLE 22

|  | Example 49 | Example 50 | Example 51 | Example 52 |
|---|---|---|---|---|
| RT block resistance |  |  |  |  |
| 125 g/cm$^2$ - 6 hours at 23° C. | 10 | 10 | 10 | 10 |
| Hot-block resistance |  |  |  |  |
| 125 g/cm$^2$ - 30 minutes at 50° C. | 10 | 10 | 10 | 10 |
| 125 g/cm$^2$ - 60 minutes at 50° C. | 10 | 10 | 10 | 10 |
| 125 g/cm$^2$ - 6 hours at 50° C. | 10 | 10 | 10 | 10 |
| Film formation at low temperature (5° C./50% R.H.) | excellent | excellent | excellent | excellent |

Examples 54 to 55

Other Strong Acid Monomers

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 0° C.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g of one of the strong acid monomers listed in Table 23, 15 g diacetone acrylamide, 2.9 g of 25% aqueous ammonia, 35.1 g 2-ethylhexyl acrylate, and 246.2 g methyl methacrylate. The calculated Tg was about +73° C.

The stable second stage monomer pre-emulsion was prepared by mixing the following components: 160.6 g DI water, 30.9 g of a 30% solution of fatty alcohol ether (12 EO units) sulfate Na salt, 11.2 g of one of the strong acid monomers listed in Table 23, 28.1 g diacetone acrylamide, 5.2 g of 25% aqueous ammonia, 317.6 g 2-ethylhexyl acrylate, and 205.6 g methyl methacrylate. The calculated Tg was about −10° C.

TABLE 23

|  | Example 54 | Example 55 |
|---|---|---|
| Special monomer | 2-acrylamido-2-methylpropane sulfonic acid sodium salt [1] | Allyloxy 2-hydroxy 3-sulfonate propane sodium salt [2] |
| Solids content | 46.0 | 46.0 |
| MFFT | ~0° C. | ~0° C. |

[1] . . . AMPS 2405 (LUBRIZOL)
[2] . . . SIPOMER COPS-1 (RHODIA)

Example 56

Transparent coating compositions, as described in Table 1, were prepared with Examples 54 and 55. In Table 24 the properties of the resulting solvent-free transparent coating composition films are listed:

TABLE 24

|  | Example 54 | Example 55 |
|---|---|---|
| RT block resistance |  |  |
| 125 g/cm$^2$ - 6 hours at 23° C. | 10 | 10 |
| Hot-block resistance |  |  |
| 125 g/cm$^2$ - 30 minutes at 50° C. | 10 | 10 |
| 125 g/cm$^2$ - 60 minutes at 50° C. | 10 | 9 |
| 125 g/cm$^2$ - 6 hours at 50° C. | 9 | 8 |
| Film formation at low temperature (5° C./50% R.H.) | good | good |

Example 57

No Acid Monomer in the Second Stage (Comparative)

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The solids content in this latex was about 46.0%, the pH about 8.0, and the MFFT was about 0° C.

The stable first stage monomer pre-emulsion was prepared by mixing the following components: 93.0 g DI water, 17.1 g of a 30% solution of fatty alcohol ether (12 EO units) sulfate Na salt, 3.0 g methacrylic acid, 3.0 g phosphoethyl methacrylate (phosphate ester of 2-hydroxyethyl methacrylate), 15 g diacetone acrylamide, 2.9 g of 25% aqueous ammonia, 35.1 g 2-ethylhexyl acrylate, and 246.2 g methyl methacrylate. The calculated Tg was +73° C.

The stable second stage monomer pre-emulsion was prepared by mixing the following components: 160.6 g DI water, 30.9 g of a 30% solution of fatty alcohol ether (12 EO units) sulfate Na salt, 28.1 g diacetone acrylamide, 5.2 g of 25% aqueous ammonia, 317.6 g 2-ethylhexyl acrylate, and 216.8 g methyl methacrylate. The calculated Tg was −9° C.

Example 58

A transparent coating composition, as described in Table 1, was prepared with Example 58. In Table 25 the properties of the resulting solvent-free transparent coating composition films are listed.

TABLE 25

|  | Example 1 | Example 57 |
|---|---|---|
| RT block resistance |  |  |
| 125 g/cm² - 6 hours at 23° C. | 10 | 10 |
| Hot-block resistance |  |  |
| 125 g/cm² - 30 minutes at 50° C. | 10 | 10 |
| 125 g/cm² - 60 minutes at 50° C. | 10 | 9 |
| 125 g/cm² - 6 hours at 50° C. | 10 | 7 |
| Film formation at low temperature (5° C./50% R.H.) | excellent | good |

Example 59 to 64

Acid Monomer Variation in the First Stage

To a 2000 mL resin kettle equipped with a condenser, nitrogen purge and feed tubes were added 472 g of DI water, 24 g of a 30% solution of fatty alcohol ether (12 EO units) sulfate Na salt, and 3.6 g of 25% aqueous ammonia. A nitrogen purge was begun and the reactor heated to 80° C. and agitated at 200 rpm. At 80° C., 0.4 g ammonium persulphate (APS) dissolved in 6.2 g DI water was added to the reactor. The first stage monomer pre-emulsion charge was fed over about 60 mins. An initiator charge of 4.0 g of APS in 64.0 g of DI water was also begun and fed at 8.30 g/min. After the first stage addition was completed, the second stage monomer pre-emulsion charge was begun and fed over about 110 mins. After all monomer and initiator feeds were complete, heating was continued for 60 minutes. After that the emulsion was cooled to 40° C. at which point latex was treated with 19.5 g of adipic dihydrazide dissolved in 190 g DI water. The emulsion was mixed for 15 minutes and cooled down and filtered through a 100 μm screen. The amount of acid monomer in the first stage, the solids content in these latexes, and the MFFTs are listed in Tables 26a and 26b.

The stable first stage monomer pre-emulsion was prepared by mixing the following components: 93.0 g DI water, 17.1 g of a 30% solution of fatty alcohol ether (12 EO units) sulfate Na salt, xg acid monomer, 15 g diacetone acrylamide, 2.9 g of 25% aqueous ammonia, 35.1 g 2-ethylhexyl acrylate, and 252.2-xg methyl methacrylate. The calculated Tgs are listed in Table 26.

The stable second stage monomer pre-emulsion was prepared by mixing the following components: 160.6 g DI water, 30.9 g of a 30% solution of fatty alcohol ether (12 EO units) sulfate Na salt, 11.2 g phosphoethyl methacrylate (phosphate ester of 2-hydroxyethyl methacrylate), 28.1 g diacetone acrylamide, 5.2 g of 25% aqueous ammonia, 317.6 g 2-ethylhexyl acrylate, and 216.8 g methyl methacrylate. The calculated Tg was −10° C.

TABLE 26a

|  | Example 59 | Example 60 | Example 61 | Example 62 |
|---|---|---|---|---|
| Acid monomer type | — | MAA | MAA | MAA |
| Acid monomer amount (g) | 0 | 1.5 (0.5%) | 3.0 (1%) | 6.0 (2%) |
| Calculated Tg of first stage polymer | +73° C. | +73° C. | +74° C. | +74° C. |
| Solids content | unstable latex | 46.0 | 46.0 | 46.0 |
| MFFT | high grit content | ~0° C. | ~0° C. | ~0° C. |

TABLE 26b

|  | Example 63 | Example 64 | Example 7 | Example 1 |
|---|---|---|---|---|
| Acid monomer type | PEMA | PEMA | PEMA | MAA + PEMA |
| Acid monomer amount (g) | 1.5 (0.5%) | 3.0 (1%) | 6.0 (2%) | 3.0 + 3.0 (2%) |
| Calculated Tg of first stage polymer | +73° C. | +73° C. | +72° C. | +73° C. |
| Solids content | 46.0 | 46.0 | 46.0 | 46.0 |
| MFFT | ~0° C. | ~0° C. | ~0° C. | ~0° C. |

Example 65

A transparent coating composition, as described in Table 1, was prepared with Examples 59, 60, 61, 62, 63, and 64. In Tables 27a and 27b, the properties of solvent-free transparent coating composition films are listed.

TABLE 27a

|  | Example 59 | Example 60 | Example 61 | Example 62 |
|---|---|---|---|---|
| RT block resistance |  |  |  |  |
| 125 g/cm² - 6 hours at 23° C. | unstable latex | 10 | 10 | 10 |
| Hot-block resistance |  |  |  |  |
| 125 g/cm² - 30 minutes at 50° C. | high grit content | 10 | 10 | 10 |
| 125 g/cm² - 60 minutes at 50° C. |  | 9 | 10 | 10 |
| 125 g/cm² - 6 hours at 50° C. |  | 8 | 9 | 10 |
| Film formation at low temperature (5° C./50% R.H.) |  | excellent | excellent | excellent |

TABLE 27b

|  | Example 63 | Example 64 | Example 7 | Example 1 |
|---|---|---|---|---|
| RT block resistance |  |  |  |  |
| 125 g/cm² - 6 hours at 23° C. | 10 | 10 | 10 | 10 |
| Hot-block resistance |  |  |  |  |
| 125 g/cm² - 30 minutes at 50° C. | 10 | 10 | 10 | 10 |
| 125 g/cm² - 60 minutes at 50° C. | 9 | 10 | 10 | 10 |

TABLE 27b-continued

| | Example 63 | Example 64 | Example 7 | Example 1 |
|---|---|---|---|---|
| 125 g/cm² - 6 hours at 50° C. | 9 | 10 | 10 | 10 |
| Film formation at low temperature (5° C./50% R.H.) | excellent | excellent | excellent | excellent |

The invention has been described in detail with particular reference to preferred embodiments thereof, but it will be understood that variations and modifications can be effected within the spirit and scope of the invention. Although specific terms are employed, they are used in a generic and descriptive sense only and not for purposes of limitation, the scope of the invention being set forth in the following claims.

The invention claimed is:

1. An aqueous dispersion, having a minimum film formation temperature no greater than about 50° C., comprising a multi-stage emulsion polymer made by a process that comprises:
   a first polymerization stage, in which a first monomer mixture having a calculated glass transition temperature of at least about 50° C. is polymerized via free radical emulsion polymerization to obtain a first-stage emulsion polymer, the first monomer mixture comprising:
      from about 80 to about 99.5% by weight of one or more ethylenically unsaturated non-ionic monomers;
      from 0 to about 5% by weight of one or more ethylenically unsaturated weak acid monomers;
      from 0 to about 5% by weight of one or more ethylenically unsaturated strong acid monomers; and
      from 0 to about 10% by weight of one or more ethylenically unsaturated monomers containing a keto group,
      wherein the first monomer mixture contains at least about 0.5% by weight of at least one of the ethylenically unsaturated strong acid monomers or the ethylenically unsaturated weak acid monomers, or mixtures thereof; and
   a second polymerization stage, in which a second monomer mixture having a calculated glass transition temperature from about −30° C. to about 10° C. is polymerized via free radical emulsion polymerization, in the presence of the first-stage emulsion polymer, to obtain the multi-stage emulsion polymer, the second monomer mixture comprising:
      from about 80 to about 99.5% by weight of one or more ethylenically unsaturated non-ionic monomers;
      from 0 to about 5% by weight of one or more ethylenically unsaturated weak acid monomers;
      from about 0.5 to about 10% by weight of one or more ethylenically unsaturated strong acid monomers; and
      from about 0.5 to about 10% by weight of one or more ethylenically unsaturated monomers containing a keto group.

2. The aqueous dispersion according to claim 1, wherein the aqueous dispersion further comprises one or more of: a molecule containing multiple —NH$_2$ or —NH— functionality, or a polyfunctional carboxylic hydrazide containing at least two hydrazide groups per molecule.

3. The aqueous dispersion according to claim 1, wherein the one or more non-ionic monomers of the first monomer mixture, or of the second monomer mixture, or both, comprise one or more of: methyl acrylate, methyl methacrylate, ethyl acrylate, ethyl methacrylate, butyl acrylate, butyl methacrylate, 2-ethylhexyl acrylate, decyl acrylate, lauryl acrylate, isodecyl methacrylate, lauryl methacrylate, hydroxyethyl methacrylate, hydroxypropyl methacrylate, acrylonitrile, methacrylonitrile, acrylamide, methacrylamide, an amino-functional monomer, an ureido-functional monomer, styrene, a substituted styrene, butadiene, ethylene, propylene, an α-olefin, vinyl acetate, vinyl butyrate, vinyl chloride, or vinylidene chloride.

4. The aqueous dispersion according to claim 1, wherein the one or more strong acid monomers of the first monomer mixture, or of the second monomer mixture, or both, comprise one or more of: 2-acrylamido-2-methylpropane sulfonic acid, 1-allyloxy-2-hydroxypropane sulfonic acid, vinylsulfonic acid, styrene sulfonic acid, an alkyl allyl sulfosuccinic acid, sulphoethyl methacrylate, sulphoethyl acrylate, phosphoethyl methacrylate (phosphate ester of 2-hydroxyethyl methacrylate), phosphoethyl acrylate, phosphopropyl methacrylate, phosphopropyl acrylate, phosphobutyl methacrylate, phosphobutyl acrylate, a phosphate ester of polyethyleneglycol acrylate or methacrylate, a phosphate ester of polypropyleneglycol acrylate or methacrylate, a phosphoalkyl crotonate, a phosphoalkyl maleate, a phosphoalkyl fumarate, a phosphodialkyl acrylate or methacrylate, a phosphodialkyl crotonate, allyl phosphate, or a salt of any of the foregoing.

5. The aqueous dispersion according to claim 1, wherein the one or more weak acid monomers of the first monomer mixture, or of the second monomer mixture, or both, comprise one or more of: acrylic acid, methacrylic acid, crotonic acid, itaconic acid, fumaric acid, maleic acid, maleic anhydride, or a salt of any of the foregoing.

6. The aqueous dispersion according to claim 1, wherein the one or more monomers containing a keto group of the first monomer mixture, or of the second monomer mixture, or both, comprise one or more of: diacetoneacrylamide, diacetonemethacrylamide, acetoacetoxyethyl methacrylate, acetoacetoxyethyl acrylate, acetoacetoxybutyl methacrylate, acetoacetoxybutyl acrylate, acetoacetoxypropyl methacrylate, acetoacetoxypropyl acrylate, acrylamidomethylacetylacetone, allyl acetoacetate, or vinyl acetoacetate.

7. The aqueous dispersion according to claim 2, wherein the molecule containing multiple —NH$_2$ or —NH— functionality comprises one or more of: hydrazine, ethylene diamine, propanediamine, butanediamine, hexanediamine, isophorone diamine, piperazine, diethylene triamine, dipropylene triamine, triethylene tetramine, an oligomer of ethylene diamine, or a poly(ethyleneimine).

8. The aqueous dispersion according to claim 2, wherein the polyfunctional carboxylic hydrazide comprises one or more of: adipic dihydrazide, oxalic dihydrazide, isophthalic dihydrazide, or polyacrylic polyhydrazide.

9. The aqueous dispersion according to claim 1, wherein the aqueous dispersion further comprises adipic dihydrazide.

10. The aqueous dispersion according to claim 1, wherein the one or more strong acid monomers of the second monomer mixture comprise phosphoethyl methacrylate (phosphate ester of 2-hydroxyethyl methacrylate), and the one or more monomers containing a keto group of the second monomer mixture comprise diacetone acrylamide.

11. The aqueous dispersion according to claim 1, wherein the one or more strong acid monomers of the second monomer mixture are present in an amount from about 1.0 to about 5.0% by weight based on the weight of the second monomer mixture.

12. The aqueous dispersion according to claim 1, wherein the one or more monomers containing a keto group of the second monomer mixture are present in an amount from about 2.0% to about 5.0% by weight based on the weight of the second monomer mixture.

13. The aqueous dispersion according to claim 1, wherein the weight ratio of the first monomer mixture with respect to the second monomer mixture is from about 20:80 to about 50:50.

14. The aqueous dispersion according to claim 1, wherein the weight ratio of the first monomer mixture with respect to the second monomer mixture is from about 30:70 to about 40:60.

15. The aqueous dispersion according to claim 1, wherein the first monomer mixture has a calculated glass transition temperature of at least about 60° C.

16. The aqueous dispersion according to claim 1, wherein the first monomer mixture has a calculated glass transition temperature of at least about 70° C.

17. The aqueous dispersion according to claim 1, wherein the second monomer mixture has a calculated glass transition temperature from about −20 to about 0° C.

18. The aqueous dispersion according to claim 1, wherein a dry film formed from the aqueous dispersion obtains a score of at least 7 on a HOT-BLOCK RESISTANCE TEST.

19. The aqueous dispersion according to claim 1, wherein a dry film formed from the aqueous dispersion obtains a score of at least 8 on a HOT-BLOCK RESISTANCE TEST.

* * * * *